United States Patent [19]

Ko

[11] Patent Number: 4,903,725
[45] Date of Patent: Feb. 27, 1990

[54] FAUCET VALVE ASSEMBLY HAVING A FLOW BUFFER DISK

[76] Inventor: Hsi-Chia Ko, No. 69, La. 22, Chang Ting Rd., Lu Kang Chen, Changhua Hsien, Taiwan

[21] Appl. No.: 330,506

[22] Filed: Mar. 30, 1989

[51] Int. Cl.⁴ .............................................. F16K 25/00
[52] U.S. Cl. ............................. 137/454.5; 137/625.31; 251/127
[58] Field of Search .................... 137/625.31, 454.5; 251/127

[56] References Cited

U.S. PATENT DOCUMENTS

| | | | |
|---|---|---|---|
| 3,834,416 | 9/1974 | Parkison | 137/625.31 X |
| 4,105,043 | 8/1978 | Nicolayczik | 137/625.31 X |
| 4,738,277 | 4/1988 | Thomas | 137/625.31 X |

Primary Examiner—Arnold Rosenthal
Attorney, Agent, or Firm—Browdy and Neimark

[57] ABSTRACT

An improved faucet valve assembly adapted for alleviating the speed and turbulence of the water flow conducted thereinto under pressure so that operational noise of the faucet can be effectively reduced to a minimum. A valve jacket is provided with 4 spaced parallel grooves on the inner wall at the bottom end thereof for permitting a ceramic stator disk to be selectively engaged therewith in several different positions, thereby the faucet can be selectively operated in either clockwise or counterclockwise direction. A flow buffer disk having a plurality of vertical protrusions is used to alleviate the turbulence of the water flow so to reduce the operational noise; a seal ring having a metallic filter net is mounted at the bottom of the valve jacket for further effecting screen and noise reduction purpose.

4 Claims, 3 Drawing Sheets

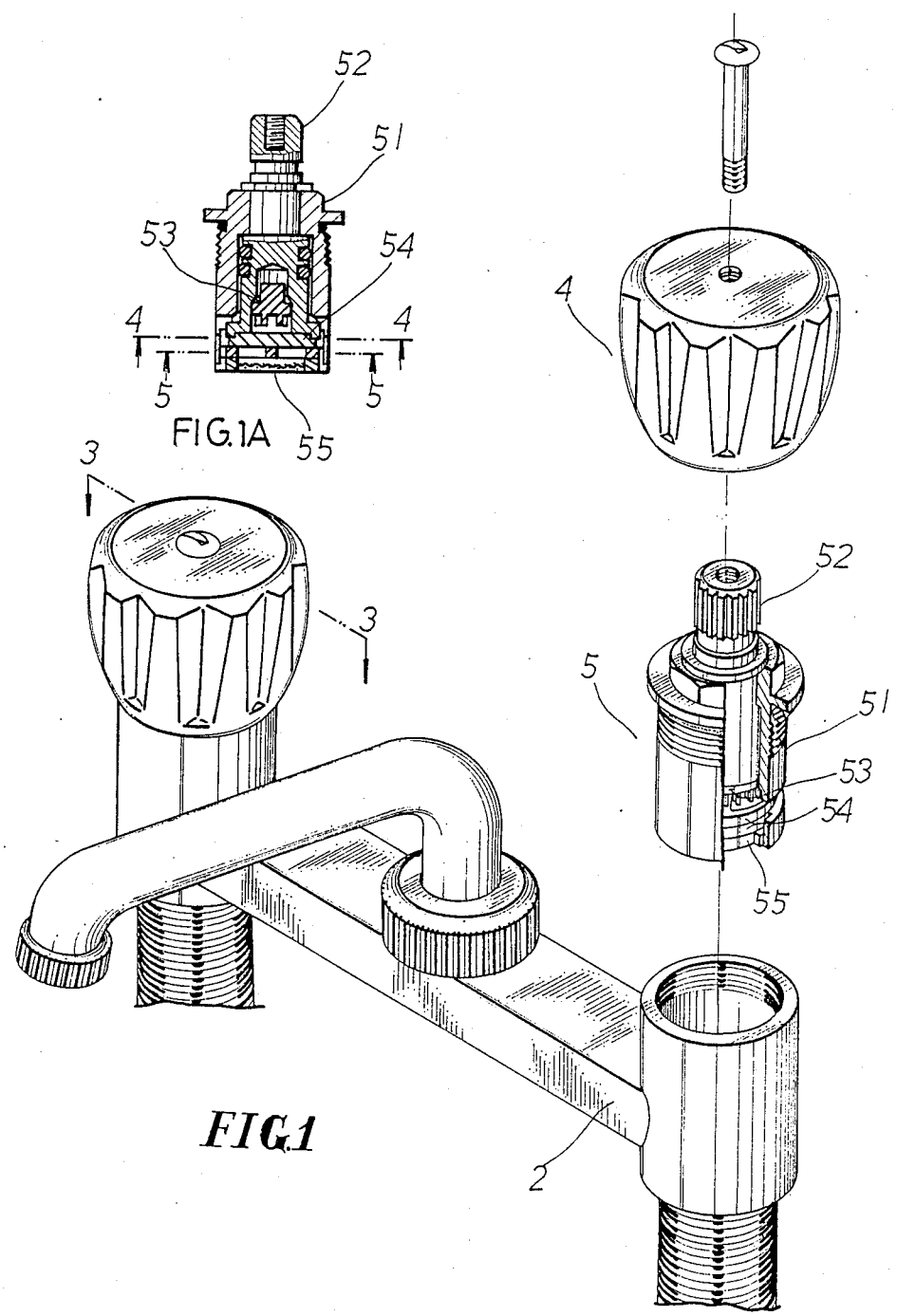

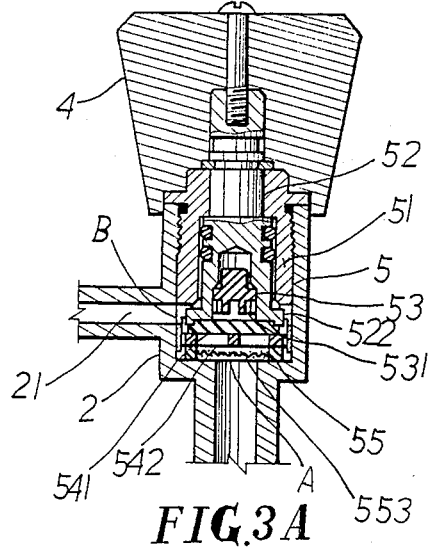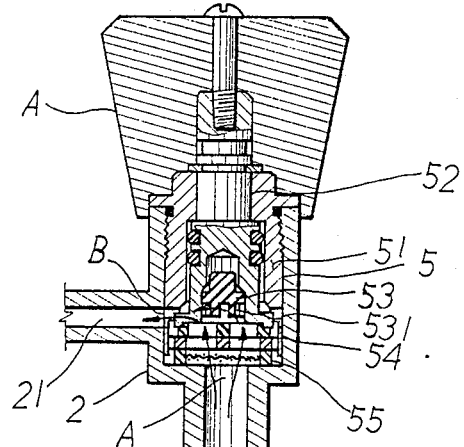
FIG.3A  FIG.3B
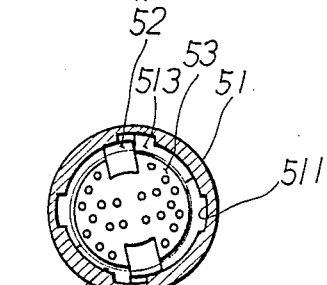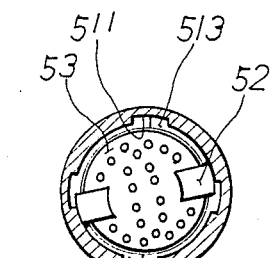
FIG.4A  FIG.4B
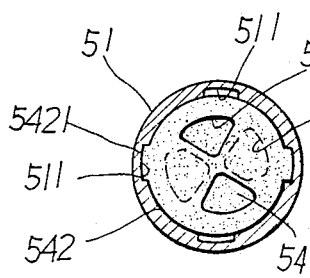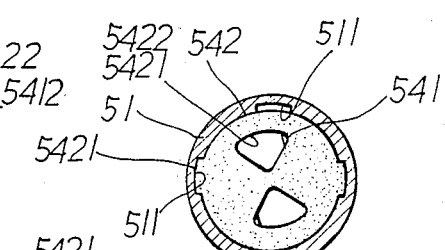
FIG.5A  FIG.5B
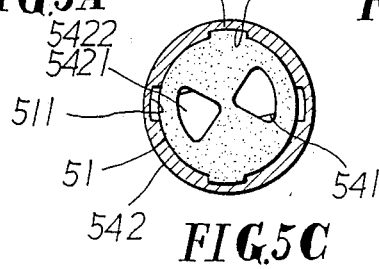
FIG.5C

FAUCET VALVE ASSEMBLY HAVING A FLOW BUFFER DISK

FIELD OF THE INVENTION

The present invention relates to an improved rotary type faucet valve assembly adapted for alleviating the turbulence of water flow under pressure conducted therethrough by means of a flow buffer disk having a plurality of vertical protrusions downward disposed in opposition to a water control disk assembly; in addition, a seal ring having a metallic filter net mounted at the central portion thereof is disposed at the bottom of a valve jacket so that water can be screened before entering the valve assembly in one aspect, and the speed of water flow under pressure can be reduced before further leading through the flow buffer disk, resulting in the reduction of operation noise in another aspect. Furthermore, four spaced parallel guide grooves are disposed on the inner wall of a valve jacket so that a stator disk of the control disk assembly can be placed in several different positions, permitting the faucet to be selectively operated in one particular direstion, such as clockwise or counter-clockwise direction, as one wishes.

BACKGROUND OF THE INVENTION

New version of faucet varies its water supply by means of a water control means 3A disposed in a faucet mount 2A, as shown in FIG. 6; a turning knob 4A is mounted on the top of the control means 3A for ready operation. The water control means 3A is provided with a valve jacket 31A having an axial shaft 32A disposed therein, and the turning knob 4A is fixed to the top of the axial shaft 32A. A water outlet port is disposed on the valve jacket 31A, in communication with the water outlet conduit 21A of the faucet seat 2A. A pair of engagement legs 321A are disposed at the bottom of the shaft 32A with a flow control disk assembly 33A engaged therewith, which consists of a ceramic rotor disk 331A and a ceramic stator disk 332A. The rotor disk is able to be rotated by the engagement legs 321A, with the stator disk fixed without spinning so that water can be selectively conducted through the outlet ports on the rotor and stator disks.

However, this type of faucet has still been operated with relatively large noise as a result of water under pressure being conducted thereinto with turbulence; the higher the water pressure is, the larger the noise the faucet produces. This results from the water inlet conduit A1 being in orthogonal relation with the water outlet conduit B1 of the faucet. Water will become violently turbulent at the right-angeled flection C1, causing large noise. Besides, between the water inlet conduit A1 and the stator disk 332, there is no filter means provided to prevent foreign particles to flow into the water control disk assembly, causing the ceramic disks to wear out readily.

The present inventor has noticed the disadvantages with the prior art faucet valve assembly and worked out an improved valve assembly which is free of all the above cited disadvantages.

SUMMARY OF THE INVENTION

The primary object of the present invention is to provide an improved faucet valve assembly which is characterized in its noise reduction and filter effects. A plurality of vertical protrusions mounted on a disk member are used to reduce the turbulence of the flow of running water so that noise can be reduced to a satisfactory level.

One further object of the present invention is to provide an improved rotary type faucet valve assembly which is particularly equipped with a rubber seal ring disposed at the bottom end of a valve jacket. In the central area of the seal ring is removalby disposed a metallic filter net which can serve as a filter in one aspect to stop foreign particles from flowing into the valve and damaging the ceramic rotor disk and stator disk, and also as a first muffler means to alleviate the noise of the flow.

One sitll further object of the present invention is to provide an improved rotary type faucet valve assembly which permits the same to be selectively assembled to operate in either direction in practical operation, by the provision of four guide grooves provided on the inner wall of the faucet jacket near the bottom end thereof so to permit the stator disk to be mounted in either direction.

BRIEF DESCRIPTION OF THE DRAWINGS

FIG. 1 is a diagram showing the instant faucet valve assembly in mounting relation with a common faucet;

FIG. 1A is a cross sectional view of the instant faucet valve assembly;

FIG. 3A is a cross sectional view of FIG. 1, taken along line 3—3, showing the instant faucet valve assembly being at a closed position;

FIG. 3B is a cross sectional view of the FIG. 1, taken along line 3—3, showing the instant faucet valve assembly being at an open position;

FIG. 4A is a cross sectional view of FIG. 1A, taken along line 4—4, which is in correspondence with FIG. 3A;

FIG. 4B is a cross sectional view of FIG. 1A, taken along 4—4, which is in correspondence with FIG. 3B;

FIG. 5A is a cross sectional view of FIG. 1A, taken along line 5—5, which is in correspondence with FIG. 3A;

FIG. 5B is a cross sectional view of FIG. 1A, taken along line 5—5, which is in correspondence with FIG. 3B;

FIG. 5C is a cross sectional view of FIG. 1A, taken along line 5—5;

DETAILED DESCRIPTION OF PREFERRED EMBODIMENT

Figure 6:
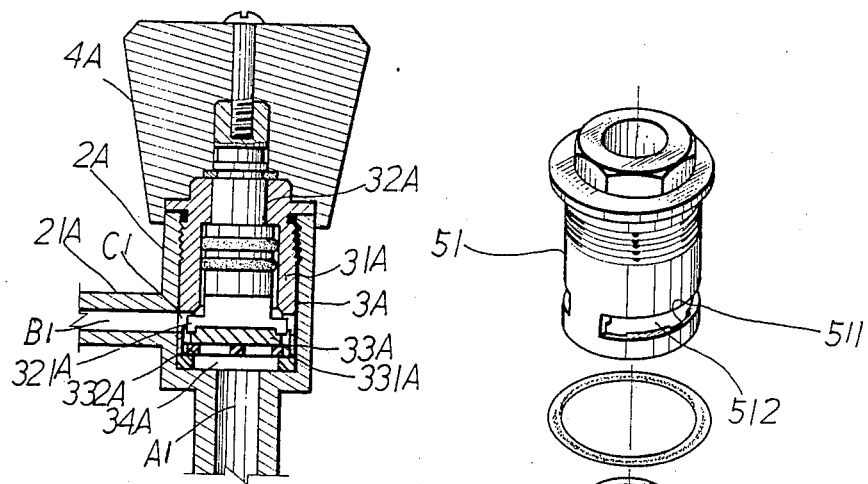
FIG. 6 is diagram of a faucet valve assembly of the prior art.
Figure 2:
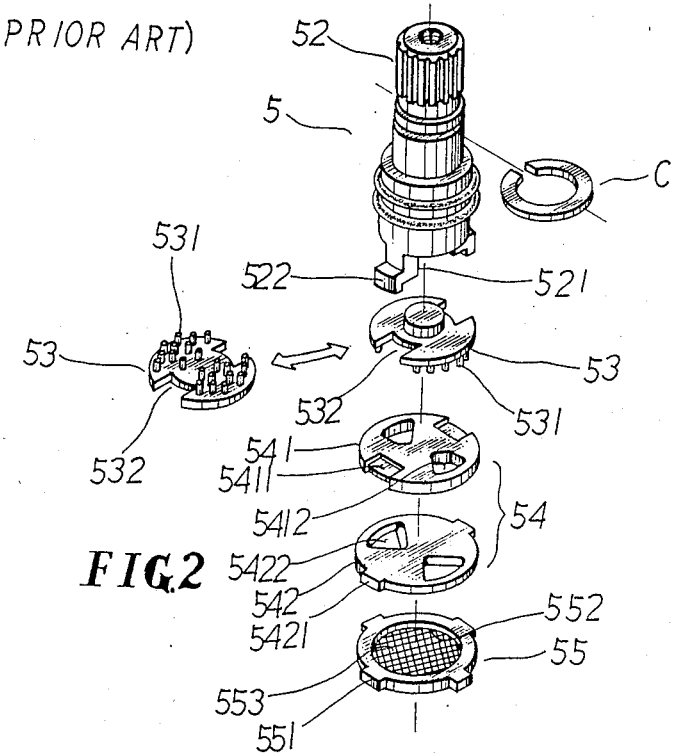
FIG. 2 is a perspective view of the exploded elements of the instant faucet valve assembly.

Referring to FIGS. 1, 2, the present faucet valve assembly 5 is removably housed in a faucet seat 2 with a turning knob 4 fixed on the top thereof by means of a screw so that the rotation of the turning knob 4 can effect the control of flow therethrough.

The valve assembly 5 of the present invention includes a tubular valve jacket 51. At the bottom end and on the inner wall thereof are disposed 4 spaced parallel guide grooves 511, and a pair of symmetrically disposed horizontal water outlet slots 512 are located at the top end of the guide grooves 511. As shown in FIGS. 3A, 3B, the water outlet slots 512 are disposed at such a level that the water conduit 21 of the faucet can be in communication therewith in assembly. On the inner wall of the valve jacket 51 and at a corresponding position of the water outlet slots 512 are provided a pair of stop protrusions 513 for restraining the movement of rotation; and on the outer surface, near the top end of the valve jacket 51 are provided a plurality of threads so that the same can be locked in place in the tubular housing of the faucet seat with a seal ring engaged therewith for prevention of leakage.

A rotatable control shaft assembly 52 is housed in the interior of the valve jacket 51 with the top portion thereof extended over the opening of the jacket. A C-shaped grip element C is adopted to fix the control shaft assembly 52 in place, and a turning knob 4 is engaged with the outward extended control shaft assembly by a screw. Seal rings and tight engagement of the control shaft assembly 52 with the valve jacket 51 can effectively prevent water leakage. A pair of step-like engagement members 522, having a restraint groove 521 defined therebetween, are extended at the bottom end of the shaft assembly 52. A flow buffer disk 53, having a plurality of spaced upright protrusions 531 disposed on one side thereof with a pair of symmetric recesses 532 defined on the periphery thereof to have an I-shaped structure, is disposed in the restraint groove 521. The recesses 532 are in fixing registry with the step-like engagement legs 522.

A flow control disk assembly 54 comprising a ceramic rotor disk 541 and a ceramic stator disk 542 is received in the interior of the valve jacket 51. On the rotor disk 541 and along the periphery thereof are disposed a pair of symmetric cavities 5411 in alignment with the recesses 532 of the flow buffer disk 53 and in engagement with the step-like engagement legs 522 of the shaft assembly 52. A pair of oppositely-disposed through ports 5412 are provided on the rotor disk 541. On the periphery of the stator disk 542, a pair of symmetric protrusions 5421 are defined for engagement with the guide grooves 511 on the inner wall of the valve jacket 51 in assembly. A pair of through ports 5422 are also disposed thereon and are able to be in selective communication with those ports 5411 of the rotor disk 541. A soft rubber seal ring 55 having four symmetric protrusions 551 disposed on the external periphery thereof is in fixing engagement with the guide grooves 511 of the valve jacket 51. A peripheral recessed groove 552 is disposed on the inner wall of the seal ring 55 so that a metallic filter net 553 can be in engagement therewith. The rubber seal ring 55 is mounted at the bottom end of the valve jacket 51 with portion thereof extended over the bottom of the valve jacket so to provide a satisfactory sealing effect between the valve jacket 51 and the faucet seat.

By rotation of the control shaft assembly 52 through the turning knob 4, the rotor disk 541 is able to be moved with respect to the stator disk 542 so to render the ports 5421 of the former in communication with the ports 5422 of the latter, permitting fluid to pass therethrough, as shown in FIGS. 3B, 5B; or the ports 5421 of the rotor disk 541 are turned away from the ports 5422 of the stator disk 542, as shown in FIGS. 3A, 5A, so that fluid can be stopped from flowing into the valve jacket 51.

The filter net 553 mounted on the rubber seal ring 55 is disposed between the disk assembly 54 received in the valve jacket 51 and the faucet seat 2. Thus, foreign particles can be prevented from entering the valve jacket 51 and the ceramic rotor and stator disks 541, 542 will not be easily worn out and can endure a longer operation life. Besides, the filter net 553 can also be used as the first flow buffer means and alleviate the noise of the flow.

The flow buffer disk 53 is fixed in the restraint groove 521 of the engagement legs 522 with a plurality of upright protrusions 531 placed on the underside thereof. The spaced upright protrusions 531 can be arranged in I shape on the surface of the flow buffer disk 53. As the fluid under pressure is conducted through the ports 5422 of the ceramic stator disk 542 from the conduit of the faucet seat Z and into the valve jacket 51, the fluid is slowed down when its flowing direction is changed and is further buffered by the plurality of upright protrusions 531 so that flow turbulence resulting from the variation of flow direction can be reduced with the noise thereof effectively alleviated.

The assembly of the present valve set into the faucet seat 2 permits an easy detachment thereof so that the filter net 553 mounted on the seal ring 55 can be readily taken out for removing of accumulated foreign particles.

A pair stop members 513 are disposed between the water outlet slots 512 of the valve jacket 51 so that the engagement legs 522 of the control shaft assembly are limited in its rotation angle, as shown in FIGS. 4A, 4B. The four grooves 511 on the valve jacket 51 permit the engagement of the protrusions 5421 of the stator disk 542 therewith so that the same can be fixed in place without rotation, as shown in FIGS. 5A, 5B. Furthermore, the four grooves 511 can facilitate the location of the stator disk 542 in any manner so that the turning direction of the faucet can be set in clock or counter-clock direction as will, as shown in Figs. 5A, 5B, 5C.

The step-like engagement legs 522 of the valve jacket 51 define the restraint groove 521 in which the flow buffer disk with a protruding rod on the opposite side of those upright protrusions 531 can be received, and the engagement legs 522 is in registry with the peripheral recesses 532 of the buffer disk directly. Furthermore, the rotor disk 541 is engaged with the engagement legs 522 with ease by the recessed cavities 5411, and the free attachment of the stator disk 542 to the valve jacket 51 makes the assembly with more ease.

It becomes apparent from the proceeding description that the present improved faucet valve assembly can be readily mounted in the faucet seat and detached therefrom for maintainence with ease, and it can be operated with less noise and endure longer life as a result of the adoption of the filter net and the flow buffer disk.

As will be apparent to those skilled in the art to which the invention is addressed, the present invention may be embodied in forms and embodiments other than that specifically disclosed above, without departing from the spirit or essential characteristics of the invention, described above, is therefore to be considered in all respects as illustrative and not restrictive . The scope of the present invention is set forth in the apended claims rather than being limited to the example set forth in the foregoing description.

What is claimed is:

1. An improved rotary-type faucet valve assembly housed in a tubular cavity of a faucet seat with a turning knob in registry with the top of said valve assembly, comprising:

a valve jacket defined in tubular form with a pair of symmetric water outlet slots disposed on the wall at the bottom end thereof, said outlet slots being in alignment and communication with the flow conduit of said faucet seat; external threads being disposed at the upper end of said valve jacket for fixing purpose;

a control shaft assembly disposed within the interior of said valve jacket and having a pair of step-like engagement legs disposed at the bottom end thereof, defining a restraint groove between said engagement legs;

a flow buffer disk having a round protrusion disposed at one side thereof and a plurality of upright protrusions planted at the other side thereof with a pair of symmetric recesses disposed on the periphery thereof;

a flow control disk assembly including a ceramic rotor disk and stator disk having passage ports disposed respectively thereon, which can be in selective communication with each other by rotation of said control shaft assembly to effect the control of the flow of fluid through said valve assembly, said rotor disk being in engagement with said engagement legs of said control shaft assembly;

a seal ring disposed at the bottom of the valve jacket; wherein the characteristic improvement lies in the adoption of said flow buffer disk disposed under said control shaft assembly and within said restraint groove and in engagement with said engagement legs, which is used to alleviate the turbulence of flow therethrough, resulting in the noise reduction in operation of the faucet.

2. An improved rotary type faucet valve assembly as claimed in claim 1 wherein said valve jacket is provided with 4 grooves on the inner wall near the bottom end and right under the water outlet slots thereof so that said ceramic stator disk can be engaged with said valve jacket in several different positions.

3. An improved rotary type faucet valve assembly as claimed in claim 1 wherein said seal ring is provided with four protrusions on the external periphery thereof for engagement with said valve jacket, and with a peripheral groove on the inner wall thereof so that a metallic filter net can be in registry therewith to screen the water flowing into the faucet.

4. An improved rotary type faucet valve assembly as claimed in claim 1 wherein said flow buffer disk has a plurality of vertical protrusions on one side thereof which are arranged in I-shaped manner.

* * * * *